US009055079B2

(12) United States Patent
Qiu et al.

(10) Patent No.: US 9,055,079 B2
(45) Date of Patent: *Jun. 9, 2015

(54) METHOD AND APPARATUS FOR GROWING NEXT GENERATION NETWORK USING MODULAR DESIGN

(75) Inventors: Chaoxin Qiu, Austin, TX (US); Robert F. Dailey, Austin, TX (US); Arshad Khan, Austin, TX (US); Jeffrey L. Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/619,742

(22) Filed: Sep. 14, 2012

(65) Prior Publication Data

US 2013/0016626 A1   Jan. 17, 2013

Related U.S. Application Data

(63) Continuation of application No. 12/638,973, filed on Dec. 15, 2009, now Pat. No. 8,305,932.

(51) Int. Cl.
| H04L 12/28 | (2006.01) |
| H04L 29/06 | (2006.01) |
| H04L 12/24 | (2006.01) |
| H04M 7/00 | (2006.01) |

(52) U.S. Cl.
CPC ........ *H04L 65/1016* (2013.01); *H04L 41/0816* (2013.01); *H04L 41/082* (2013.01); *H04M 7/0087* (2013.01); *H04L 65/1013* (2013.01)

(58) Field of Classification Search
CPC .............. H04L 41/0816; H04L 41/082; H04L 65/1013; H04L 65/1016; H04M 7/0087
USPC .......... 370/252–254, 352, 338; 455/433, 436, 455/560, 435.1, 432.1
See application file for complete search history.

(56) References Cited

U.S. PATENT DOCUMENTS

| 8,078,166 | B2 | 12/2011 | Thiebaut et al. | |
| 8,305,932 | B2* | 11/2012 | Qiu et al. | 370/254 |
| 8,373,538 | B1* | 2/2013 | Hildner et al. | 340/3.1 |
| 8,438,257 | B2* | 5/2013 | Belinchon Vergara et al. | 709/223 |
| 2007/0061813 | A1 | 3/2007 | Beal et al. | |
| 2008/0160995 | A1 | 7/2008 | Thiebaut et al. | |
| 2009/0055899 | A1 | 2/2009 | Deshpande et al. | |
| 2010/0293261 | A1* | 11/2010 | Belinchon Vergara et al. | 709/223 |

* cited by examiner

Primary Examiner — Chuong T Ho

(57) ABSTRACT

A method and system for growing a next generation network (NGN) using a modular design are disclosed. For example, the method defines a growth core module to support a specific number of subscribers, wherein the growth core module is assigned a module identifier (ID). The method upgrades existing network entities that will be impacted by an installation of the growth core module in the existing IMS network, and installs the growth core module in the IMS network.

9 Claims, 4 Drawing Sheets

METHOD AND APPARATUS FOR GROWING NEXT GENERATION NETWORK USING MODULAR DESIGN

This application is a continuation of U.S. patent application Ser. No. 12/638,973, filed Dec. 15, 2009, which is currently allowed and is herein incorporated by reference in its entirety.

The present disclosure relates generally to communication network and, more particularly, to a method and apparatus for growing a next generation network (NGN) using a modular design.

BACKGROUND

The trend in the telecommunication industry is to evolve the communication infrastructure from deploying specialized hardware with proprietary application (e.g., traditional class 5 end office switch) to deploying commodity hardware, open Operating System (OS) platform, and open application software (e.g., soft switches, $3^{rd}$ Generation Partnership Project (3GPP) Internet Protocol Multimedia Subsystem (IMS) architecture, etc.). The result of this movement is that the next generation network (NGN) consists of an extremely large number of diversified types of hardware servers running a variety of open OS and software applications that need to work together to provide end-to-end communication services.

An NGN, e.g., an IMS network, comprises hundreds of network entities (e.g., standard servers, blade servers, specialized gateways, terminal servers using Linux, HP-UX, SUN Solaris Operating Systems etc.) to support end-to-end services for millions of subscribers. Each of these servers is responsible for a portion of the end-to-end communication services in an end-to-end call flow.

Daunting challenges arise as an NGN service provider continue to grow an NGN network due to the interdependency of existing network entities and new network entities to be deployed. Installing a new network entity involves upgrading and re-configuration of many already deployed network entities that need to interact with the newly installed network entity.

In addition, open OS and application software used by the deployed network entities require frequent maintenance updates, e.g., OS and software patches and new releases, etc. An upgrade operation on a network entity can impact other network entities it interacts with. An upgrade error can expose the entire network to the risk of service interruption for all subscribers.

Since network entities use different hardware and OS architecture and are implemented to support different part of the end-to-end communication service processing, the capacity of each network entity varies dramatically. At any given stage of the network growth, the network capacity may be limited by a different type of network entity. Thus, an NGN operator must constantly deploy additional network entities whenever capacity needs become necessary for a particular type of network entity or server. Given the aforementioned network growth complexity, an NGN operator faces a difficult challenge in the growth and the maintenance of an NGN.

SUMMARY

In one embodiment, a method and system for growing a next generation network (NGN) using a modular design are disclosed. For example, the method defines a growth core module to support a specific number of subscribers, wherein the growth core module is assigned a module identifier (ID). The method upgrades existing network entities that will be impacted by an installation of the growth core module in the existing IMS network, and installs the growth core module in the IMS network.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

As discussed above, given the network growth complexity and the cycle of maintenance, ordering, testing, and installation, an NGN operator is challenged by the growth and maintenance of an NGN. To address this criticality, the present disclosure enables the growth of a next generation network (NGN), such as an Internet Protocol Multimedia Subsystem (IMS) network, by using a modular design.

Figure 1:
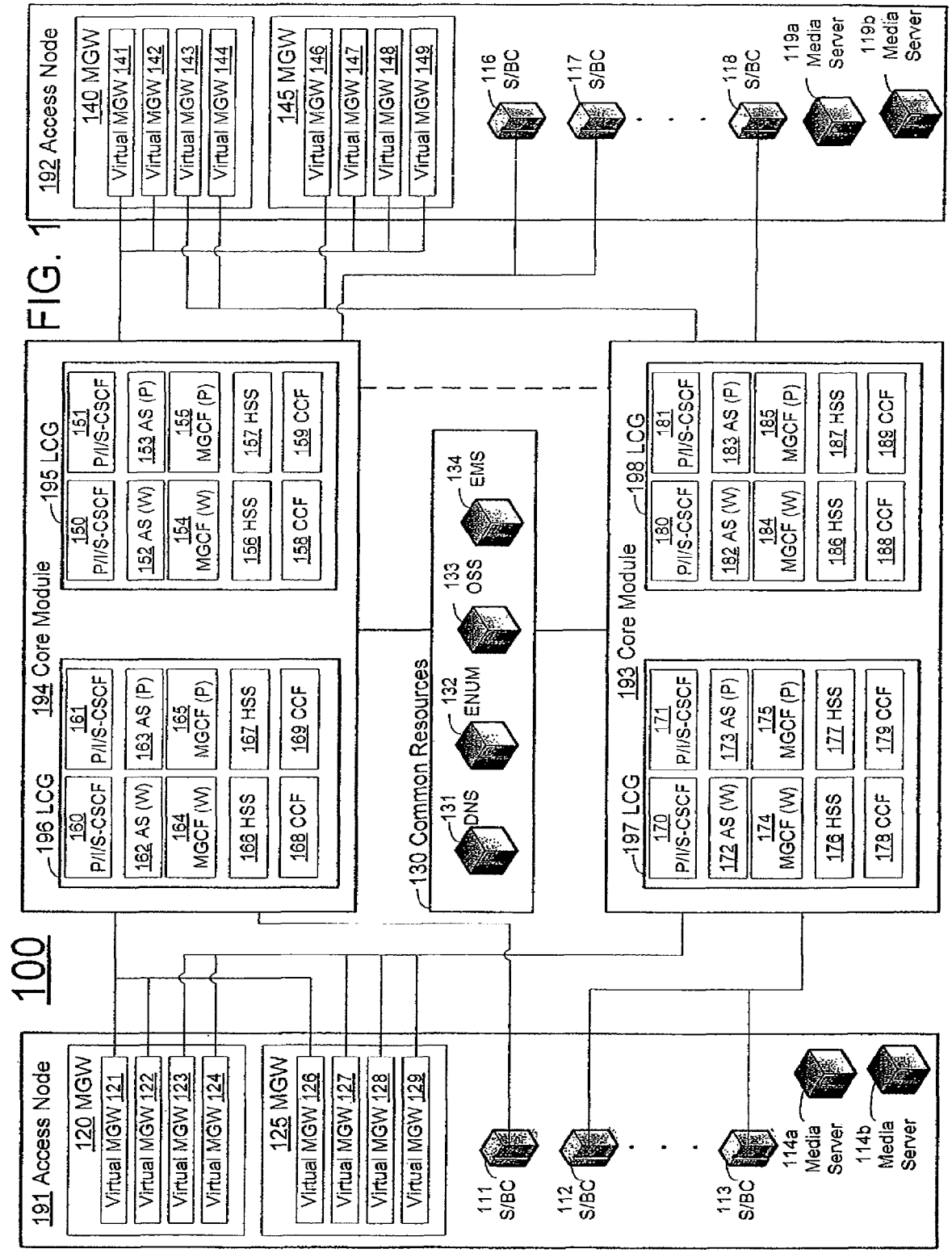
FIG. 1 illustrates an exemplary NGN, e.g., an IMS communication network.

FIG. 1 illustrates an exemplary NGN 100, e.g., an IMS communication network. In FIG. 1, NGN 100 illustratively comprises three main components: 1) the access nodes 191 and 192, 2) the core modules 193 and 194, and 3) the common resources 130. Note that all these components comprise call processing or call processing related network entities.

Each access node comprises a plurality of Media Gateways (MGWs), Session Border Controllers (S/BCs), and Media Servers (MSs). For instance, access node 191 comprises a plurality of MGWs including MGW 120 and MGW 125, a plurality of S/BC including S/BC 111, S/BC 112, and S/BC 113, and a plurality of Media Servers such as MSs 114a-b. Furthermore, each MGW comprises a plurality of virtual MGW through virtualization. A virtual MGW is a logical instance of MGW within a physical MGW. For example, MGW 120 comprises four virtual MGWs, e.g., Virtual MGWs 121, 122, 123, and 124, while MGW 125 comprises four virtual MGWs, e.g., MGWs 126, 127, 128, and 129.

Similarly, access node 192 comprises a plurality of MGWs including MGW 140 and MGW 145, a plurality of S/BC including S/BC 116, S/BC 117, and S/BC 118, and a plurality of Media Servers such as MSs 119a-b. Furthermore, each MGW comprises a plurality of virtual MGW through virtualization. A virtual MGW is a logical instance of MGW within a physical MGW. For example, MGW 140 comprises four virtual MGWs, e.g., Virtual MGWs 141, 142, 143, and 144, while MGW 145 comprises four virtual MGWs, e.g., MGWs 146, 147, 148, and 149.

Access nodes serve as the points of entry to NGN 100. In particular, MGWs provide access to Public Switched Telephone Network (PSTN) endpoints connected via a PSTN to NGN 100. S/BCs provide access to Voice over Internet Protocol (VoIP) endpoints connected via a packet switched network, e.g., an IP network, to NGN 100. In one embodiment, an access office is a physical location in which one or more access nodes are located to serve subscribers in a local vicinity.

Broadly defined, an S/BC is a network entity that provides the security boundary for an IMS network infrastructure. The S/BC provides traffic controls, protocol verification, protocol conversion, hosted Network Address Translation (NAT), session managed media anchor or release, and records Call Detail Record (CDR) events, etc. A MGW is a network entity that provides service interworking between a Public Switched Telephone Network (PSTN) and an IMS network.

A Media Server is a network entity that supports the Media Resource Function (MRF) providing media related functions such as media manipulation (e.g., telephone conferencing, transcoding, and so on) and playing of tones and announcements.

In one embodiment, common resources 130 comprise network entities that support call processing related functions. In one embodiment, common resources 130 may comprise one or more of a Domain Name System (DNS) server 131, an E.164 Number Mapping (ENUM) server 132, Operations Support Systems (OSS) 133, and an Element Management System (EMS) 134. DNS server 131 provides support of domain name to IP address resolution functions. ENUM server 132 provides translation support of a telephone number into a Uniform Resource Identifier (URI) or IP address that is used in NGN 100. OSS 133 refers to systems that provide operations support, such as provisioning and maintenance functions, of call processing network entities in NGN 100. EMS 134 refers to systems that provide management support of individual call processing network entities in NGN 100.

Note that network entities in common resources 130 are shared by a plurality of core modules, such as core modules 193 and 194.

Each core module comprises two or more local component groups (LCG). For example, core module 193 comprises LCG 197 and LCG 198, while core module 194 comprises LCG 195 and LCG 196. Even though only two LCGs are shown in each core module in FIG. 1, the present disclosure is not so limited. In other words, each core module may employ any number of LCGs.

In one embodiment, the present method enables a service provider to grow the call processing capacity in an NGN in a modular fashion by adding growth core modules as needed. Note that the term growth core module refers hereafter to a new core module that is to be added to the NGN 100 to augment call processing capacity due to an increased customer traffic demand. To illustrate the modular growth principle, assuming that the core module 193 has been designed to support a specific number of subscribers in the NGN 100 and has been in service for a period of time. The number of subscribers supported by NGN 100 has been growing and the call processing capacity supported by the core module 193 is about to be exceeded. Instead of adding additional call processing network entities in the core module 193 in an ad hoc fashion, the present method enables a service provider to grow the call processing capacity by adding a growth core module, such as the core module 194, which is modularly designed to support a specific number of additional subscribers in the NGN 100.

Note that each core module contains a group of network entities that collectively provide resources to support end-to-end communication services for a designed number of subscribers. The number of each type of call processing network entities in each core module is optimized to support a specific number of subscribers. Note that the number of each type of call processing network entities in each core module is engineered based on a specific call processing capacity target; therefore, the number of each type of call processing network entities in each core module does not need to be the same. For example, if the call processing capacity target is 600,000 subscribers for a core module, and each P/I/S-CSCF can support 300,000 subscribers as well as each HSS can support 110,00 subscribers, then the core module will require at least two P/I/S-CSCF network entities and at least six (6) HSS network entities. Note that in this example, the six (6) HSSs can support up to 660,000 subscribers, where there is an excess call processing capacity of 60,000 subscribers. By taking into considerations of the call processing capacity of each type of call processing network entities, a call processing capacity target can be designed and established in an optimized fashion to minimize overall excess capacity in each type of network entity and then the number of each type of call processing network entities can be determined.

In one embodiment, each LCG in each core module is located in a different server office. A server office is a physical location in which call processing network entities within an LCG are located. For instance, call processing network entities in LCG 197 can be located in one physical location, e.g., a server office in Richardson, Tex., while call processing network entities in LCG 198 can be located in another physical location, e.g., a server office in Philadelphia, Pa.

Each LCG within a core module comprises call processing network entities that support call processing functions in the NGN 100, including a plurality of Proxy Call Session Control Functions (P-CSCFs), a plurality of Intermediate Call Session Control Functions (I-CSCFs), a plurality of Serving Call Session Control Functions (S-CSCFs), a plurality of Application Servers (ASs), a plurality of Home Subscriber Servers (HSSs), a plurality of Media Gateway Control Functions (MGWFs), and a plurality of Call Charging Related Functions (CCFs).

Broadly defined, a Call Session Control Function (CSCF) network entity is an IP Multimedia Services (IMS) based session control layer network entity that is responsible for call session setup, mid-session control, and teardown. In particular, an Interrogating CSCF (I-CSCF) is a network entity that provides topology hiding and helps to forward requests between a Media Gateway (MGW) and a Serving CSCF (S-CSCF) network entity as well as Application Servers (AS). A Serving CSCF (S-CSCF) is a network entity that provides session control, call signaling routing to applications, and SIP registrar functions. An Application server (AS) is a network entity that hosts and executes service specific applications on behalf of an IMS core network, and interfaces with the S-CSCF using a communication protocol, e.g., a Session Initiation Protocol (SIP). A Media Gateway Control Function (MGWF) is a network entity that provides control functions to a MGW. A Call Charging Related Function (CCF) network entity provides call charging related processing functions in an IMS network. A Home Subscriber Server (HSS) supports subscription-related information (e.g., subscriber profiles) and performs authentication and authorization of the subscribers. A Proxy-CSCF (P-CSCF) is a SIP proxy that is the first point of contact for an IMS endpoint device.

For instance, in the core module 194, LCG 195 comprises P/I/S-CSCF 150 and P/I/S-CSCF 151, AS 152 and AS 153, MGCF 154 and MGCF 155, HSS 156 and HSS 157, CCF 158 and CCF 159, while LCG 196 comprises P/I/S-CSCF 160 and P/I/S-CSCF 161, AS 162 and AS 163, MGCF 164 and MGCF 165, HSS 166 and HSS 167, CCF 168 and CCF 169

Similarly, in core module 193, LCG 197 comprises P/I/S-CSCF 170 and P/I/S-CSCF 171, AS 172 and AS 173, MGCF 174 and MGCF 175, HSS 176 and HSS 177, CCF 178 and CCF 179, while LCG 198 comprises P/I/S-CSCF 180 and P/I/S-CSCF 181, AS 182 and AS 183, MGCF 184 and MGCF 185, HSS 186 and HSS 187, CCF 188 and CCF 189.

In one embodiment, the P-CSCF, the I-CSCF, and the S-CSCF are implemented in a single network entity, such as the P/I/S-CSCF 150. However, the present disclosure allows the P-CSCF, the I-CSCF, and the S-CSCF to be implemented in one or more network entities. For instance, in another embodiment, the P-CSCF can be implemented in one network entity, the I-CSCF can be implemented in another separate network entity, and the S-CSCF can be implemented in yet another separate network entity.

Furthermore, the P-CSCF can be incorporated into a core module in NGN 100 in one embodiment or the P-CSCF can be incorporated into a S/BC in an access node in another embodiment.

Within each core module, device level redundancy and geographical level redundancy are supported with extra resource and capacity reserved. Failover protection of a call processing network entity is always executed within a core module.

There are various options of network entity failover protection in a core module. In one embodiment for local device level redundancy, a network entity can be equipped with redundant local blade residing within its own equipment cabinet for failover protection. Therefore, when an active call processing blade fails, the redundant call processing blade will take over the call processing operations. For instance, a call processor blade residing in P/I/S-CSCF 170 in core module 193 can be protected by a redundant call processor blade residing locally within the same equipment cabinet that houses the network entity P/I/S-CSCF 170 for failover protection.

In another embodiment for local device level redundancy, a network entity can be backed up by a similar redundant network entity residing in the same server office, e.g., in the same physical location, for failover protection. Therefore, when an active call processing network entity fails, the redundant call processing network entity in the same server office will take over the call processing operations. For example, HSS 176 in core module 193 can be backed up by HSS 177 located in the same server office for failover protection.

In one embodiment for geographical level redundancy, a network entity can be backed up by a similar redundant network entity residing in a remote server office for failover protection. Therefore, when an active call processing network entity fails, the redundant call processing network entity in the a remote server office will take over the call processing operations. For example, the active AS 172 in LCG 197 located within a server office can be backed up by the redundant, or protection AS 183 in LCG 198 located at a remotely located server office for failover protection.

In another embodiment for geographical level redundancy, an entire LCG can be backed up by another LCG residing in a remote server office in the same core module for failover protection. Therefore, when a LCG fails, another LCG located in a remote server office in the same core module will take over the call processing operations. For example, in core module 193, the LCG 197 located in a server office can be backed up by the LCG 198 located at a remote server office for failover protection.

The design of a NGN core module has several design characteristics. For example, the grouping of network entities in a core module is carefully selected such that each core module has minimal interfaces with other core modules and the functioning of each core module has minimal dependency on other core modules. In other words, when a growth core module is added to a NGN, it will minimize impacts to existing core modules already deployed. As customer traffic demand increases, additional growth core modules can be replicated and added with minimal impact on existing deployed modules. Significant time saving for growing NGN capacity can be achieved by using the modular growth principle to deploy growth core modules in a NGN as needed.

Each core module contains a group of network entities that collectively provide resources to support end-to-end communication services for a designed number of subscribers. It is necessary to ensure that the subscribers are using the resources in the core modules they are designated to for their communication needs. In other words, each core module provides full end-to-end communication services to a disjoined set of subscribers, and every subscriber is registered with a particular core module and uses network resources in that particular core module for communication needs.

In one embodiment, each core module is assigned an individual module identifier (ID) of its own. Each subscriber and each network entity associated with the same core module that is used to process calls for that subscriber are all assigned the same module ID as well. For example, the module ID is stored in the OSS systems, such as the subscriber database, the subscriber provisioning system, and the network equipment inventory system, etc. The service provider can use the assigned module ID to easily decide to which the core module a faulty network entity belongs or in which the core module a complaining subscriber is supposed to be served.

For instance, the subscriber provisioning system will configure the subscriber's endpoint device such that it will be communicatively coupled with the S/BCs of the designated core module. The S/BCs are configured to be communicatively coupled with the P-CSCFs within the same core module. The P-CSCFs are configured to be communicatively coupled with the I-CSCFs within the same core module. The I-CSCFs are configured to assign new registering subscribers to the S-CSCFs in the same core module. In addition, if a HSS is responsible for assigning a S-CSCF to a new registering subscriber, the HSS uses the modular relationship to assign a subscriber to the S-CSCF in the core module associated with the subscriber module ID.

For any AS involved, the subscriber provisioning system assigns the appropriate application server URI in the iFCs (initial Filter Criteria) in the subscriber service profile associated with a subscriber so that a S-CSCF will always invoke the application servers within the same core module having the same module ID when providing communication services to the subscriber designated to that core module. Application servers are further configured to utilize media resources within the same core module having the same module ID when needed for communication services.

To illustrate further, core module 193 is assigned a module ID of 193. Therefore, all call processing network entities in LCG 197 and LCG 198 are assigned the same module ID of 193. In addition, as shown in FIG. 1, S/BC 112, S/BC 113, S/BC 118 are associated with and interconnected to core module 193; therefore, they are also assigned a module ID of 193. Similarly, Virtual MGWs 123, 124, 127, 128, 129, 143, 144, and 146 are associated with and interconnected to core module 193, therefore, they are also assigned a module ID of 193. All subscribers served by NGN 100 connected via the aforementioned S/BCs or Virtual MGWs are all assigned the same module ID, 193, and utilize network entities in access nodes 191 and 192 having the same module ID as well as network entities in core module 193 having the same module ID for communication service needs. Furthermore, media servers in the same module are assigned the same module ID.

In one embodiment, it should be noted that corresponding S/BC(s), MGW(s), and/or MS(s) may need to be added to support a growth core module, e.g., core modules 193 or 194. As discussed above, associated S/BC(s), MGW(s), and MS(s) are employed to provide end-to-end communication services. As such, when additional core modules are deployed in the network 100, additional S/BC(s), MGW(s), and/or MS(s) may need to be added as well to the pertinent access node.

Similarly, core module 194 is assigned a module ID of 194. Therefore, all call processing network entities in LCG 195 and LCG 196 have the same module ID of 194. In addition, as shown in FIG. 1, S/BC 111, S/BC 116, S/BC 117 are associated with and interconnected to core module 194; therefore, they are also assigned a module ID of 194. Similarly, Virtual MGWs 121, 122, 126, 141, 142, 147, 148, and 149 are associated with and interconnected to core module 194, therefore, they are also assigned a module ID of 194. All subscribers served by NGN 100 connected via the aforementioned S/BCs or Virtual MGWs are all assigned the same module ID, 194, and utilize network entities in access nodes 191 and 192 having the same module ID as well as network entities in core module 194 having the same module ID for communication service needs.

Note that an S/BC can only be associated with one core module at a time; hence, subscribers served by the S/BC are associated with the same core module and have the same module ID. Similarly, a Virtual MGW can only be associated with one core module at a time; hence, subscribers served by the Virtual MGW are associated with the same core module and have the same module ID.

Due to the modular nature of NGN 100, each S/BC does not need to be fully connected to every core module. This helps to minimize inter-module dependency and to minimize required configuration changes to existing core modules when a growth core module is introduced into the NGN. In addition, the modular design also allows access nodes or access offices to be deployed throughout the lifecycle of a core module and does not require access nodes or access offices to be deployed simultaneously with their associated core module. In other words, access capacity to a core module can be added incrementally over a period of time whenever it becomes necessary.

In addition, a growth core module, such as core module 194, can be quickly deployed in a production NGN network in a probation mode in which only tester accounts are assigned to the growth core module. The growth core module can thus be fully tested before the probation is lifted and the core module is then made available to support subscribers. A growth core module can be installed, acceptance tested, and verification tested, with minimal usage of Maintenance Windows (MW) since the growth core module interfaces with a minimal number of active call processing network entities that support live customer traffic. This will also significantly reduce software upgrade time because one core module can be updated independently from other core modules. The modular growth principle also avoids the need to replace manufacturer discontinued equipment in an already deployed core module unless driven by a service need. For example, a growth core module will incorporate only newer generation hardware without deploying manufacturer discontinued equipment. An additional benefit of the modular growth principle is that lab equipment needs and testing requirements can be minimized because growth core modules that are added can be characterized independently before the impacts on already deployed core modules are characterized.

In order for a PSTN network to route a PSTN originated call that is to be terminated to a NGN subscriber via a MGCF in the correct core module (i.e., the core module to which the terminating subscriber is associated with), a specific Location Routing Number (LRN) will be utilized. A LRN is allocated for each MGCF in a specific core module in each PSTN access tandem switch. PSTN tandem switches are communicatively coupled with the NGN network and will be provisioned such that PSTN incoming calls will use different LRNs to route to the correct module that called parties belong to.

For instance, a PSTN access tandem switch is connected to MGW 120 via a plurality of trunk groups, e.g., a plurality of T1 facilities. Each virtual MGW in MGW 120 is connected to the access tandem switch using a different trunk group. For example, a call originated from the PSTN is to be terminated to a called party served by a module, say 193. In order to route the call to the correct core module, in this case core module 193, by the access tandem switch, the access tandem switch needs to use an LRN assigned to identify an MGCF associated with core module 193 to route the call accordingly. By using the proper LRN to route the call, the call will be routed via an appropriate virtual MGW to a MGCF associated with core module 193 and will then be processed by the MGCF in core module 193 appropriately.

It should be noted that the elements shown as being deployed in a core module in FIG. 1 is only illustrative. In other words, whether or not a network entity or element is in a core module or as part of the common resources depends on its capacity and relationship to other network entities. For example, if a HSS has a very large capacity to support multiple modules, then the HSS could be deemed to be a part of the common resource. For another example, the entire MGC and MGW can be configured as "media layer" common resources. For example, one can deploy a dedicated I-CSCF server (or servers) and MGC/MGW as part of the common resources. When a PSTN user makes a call to an IMS network, the access tandem switch does not need to know the LRN specifically assigned to the module. The incoming call can be directed to any MGC, which forwards the INVITE message to the dedicated I-CSCF server(s). The I-CSCF will be able to look up the HSS database to find out which module the called party belongs to and to which S-CSCF in that module the subscriber has registered. The dedicated I-CSCF in the common resource will then be able to forward the call to the module the called party belongs to.

Figure 2:
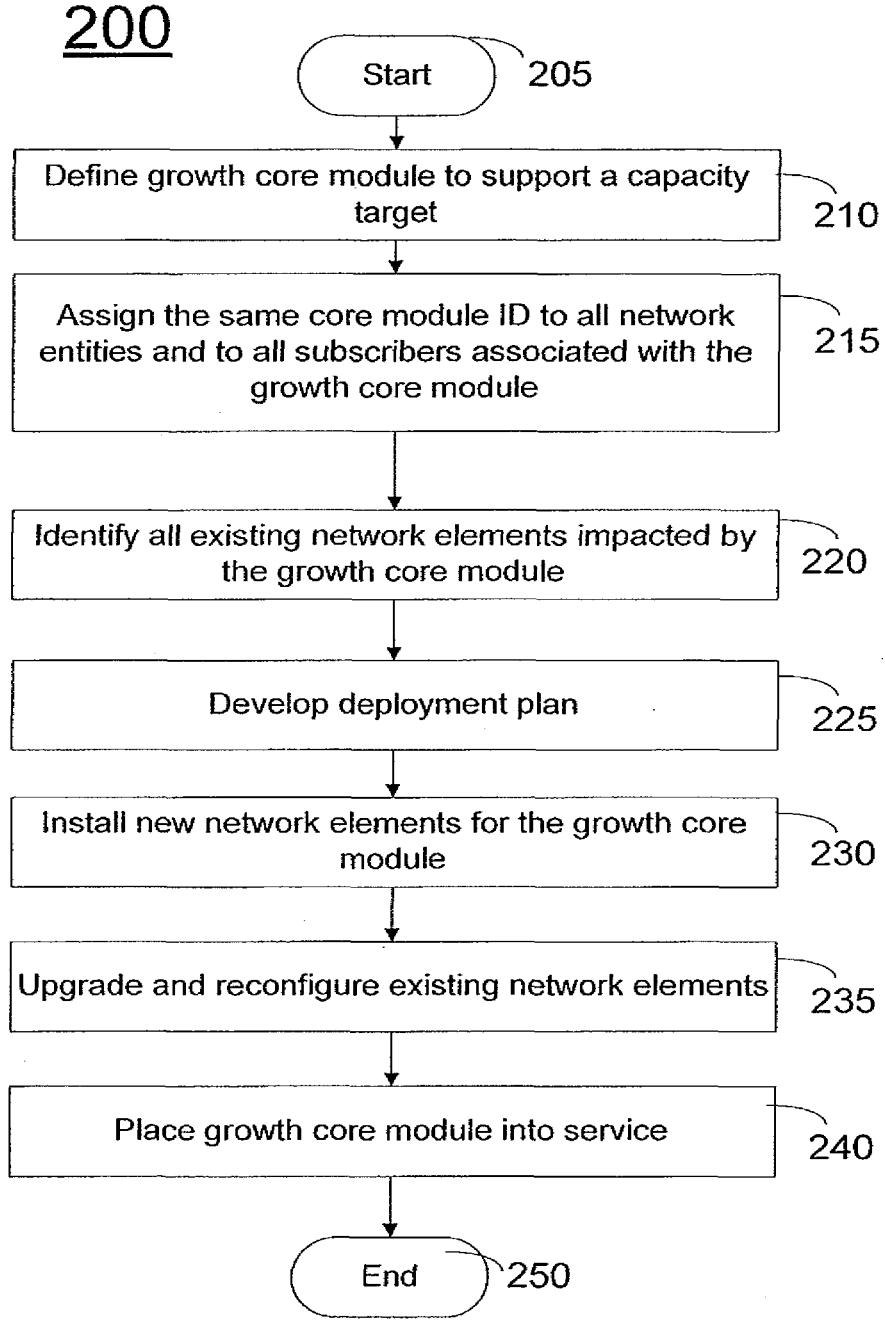
FIG. 2 illustrates a flowchart of a method of deploying a growth core module in an NGN.

FIG. 2 illustrates a flowchart of a method 200 of deploying a growth core module in an NGN, e.g., an IMS network, of the present disclosure. Method 200 starts in step 205 and proceeds to step 210.

In step 210, the service provider defines a growth core module that contains a group of network entities that collectively provide resources to support end-to-end communication services for a designed number of subscribers (e.g., a capacity target). In one embodiment, the growth core module comprises two or more local component groups (LCGs). Each LCG within the growth core module comprises call processing network entities that support call processing functions in a NGN, including a plurality of Proxy Call Session Control Functions (P-CSCFs), a plurality of Intermediate Call Session Control Functions (I-CSCFs), a plurality of Serving Call Session Control Functions (S-CSCFs), a plurality of Application Servers (ASs), a plurality of Home Subscriber Servers (HSSs), a plurality of Media Gateway Control Functions (MGWFs), and a plurality of Call Charging Related Functions (CCFs). Note that each LCG in the growth core module is located in a different server office. A server office is a physical location in which call processing network entities within an LCG are located. Note that the growth core module provides full end-to-end communication services to a disjoined set of subscribers, and every subscriber is registered with a particular core module and uses network resources in that particular growth core module for communication needs.

In step 215, the service provider assigns an individual growth core module ID for all subscribers and network entity instances associated with the growth core module. Each subscriber, each network entity in the growth core module, and each network entity in access nodes associated with the same growth core module used to process calls for that subscriber are all assigned the same module ID as well. For example, the module ID is stored in the OSS systems, such as the subscriber database, the subscriber provisioning system, and the network equipment inventory system, etc. The service provider can use the assigned module ID to easily decide to which the core module a faulty network entity belongs or in which the core module a complaining subscriber is supposed to be served.

For instance, the subscriber provisioning system will configure the subscriber endpoint device such that it will be communicatively coupled with the S/BCs of the designated growth core module. The S/BCs are configured to be communicatively coupled with the P-CSCFs within the same growth core module. The P-CSCFs are configured to be communicatively coupled with the I-CSCFs within the same growth core module. The I-CSCFs are configured to assign the subscriber endpoint device to the S-CSCFs in the same growth core module. In addition, if a HSS is responsible for assigning a S-CSCF to the subscriber endpoint device, the HSS uses the modular relationship to assign the subscriber endpoint device to an S-CSCF in the growth core module associated with the subscriber module ID.

For any AS involved, the subscriber provisioning system assigns the appropriate application server URI in the iFCs (initial Filter Criteria) in the subscriber service profile associated with the subscriber endpoint device so that a S-CSCF will always invoke the application servers within the same growth core module when providing communication services to the subscriber endpoint device designated to that growth core module. Application servers are further configured to utilize media resources within the same growth core module when needed for communication services.

In step 220, the service provider identifies all existing network entities in other existing core modules or in common resources that need to be reconfigured or modified when the growth core module is deployed. The service provider identifies any existing network entities that shall be upgraded with new software or hardware versions and any network entities in other existing core modules or common resources that could be interrupted by the installation of new network entities in the growth core module. These will determine what part of the deployment of the growth core module would require to be installed in a maintenance window.

In step 225, the service provider completes a deployment plan for the installation of the growth core module that includes the sequencing of installation of new network entities associated with the growth core module, the scheduling to take into consideration of maintenance window requirements, and the re-configuration or upgrade of existing network entities residing in other existing core modules or common resources.

In step 230, the service provider installs the new network entities associated with the growth core module. Using combinations of firewall rules and temporary configurations, the growth core module is segregated from the rest of the production NGN. This allows live customers to be served by the existing core modules using the existing network entities and the growth core module to be tested for end-to-end communication services by a small number of testers in a probation mode. In other words, intra-module communication for the growth core module is enabled but communication between the growth core module and the rest of the existing network, e.g., existing core modules, is limited to prevent any problem in the growth core module from impacting live customer services.

In step 235, the service provider upgrades or reconfigures existing network entities that have been identified in step 220 according to the deployment plan completed in step 225.

In step 240, the service provider removes any temporary firewall rules and configurations that limit the communication between the growth core module and the rest of the existing network. The growth core module is now ready for production services. The service provider places the growth core module into active service to service live customer traffic. The method ends in step 250.

Figure 3:
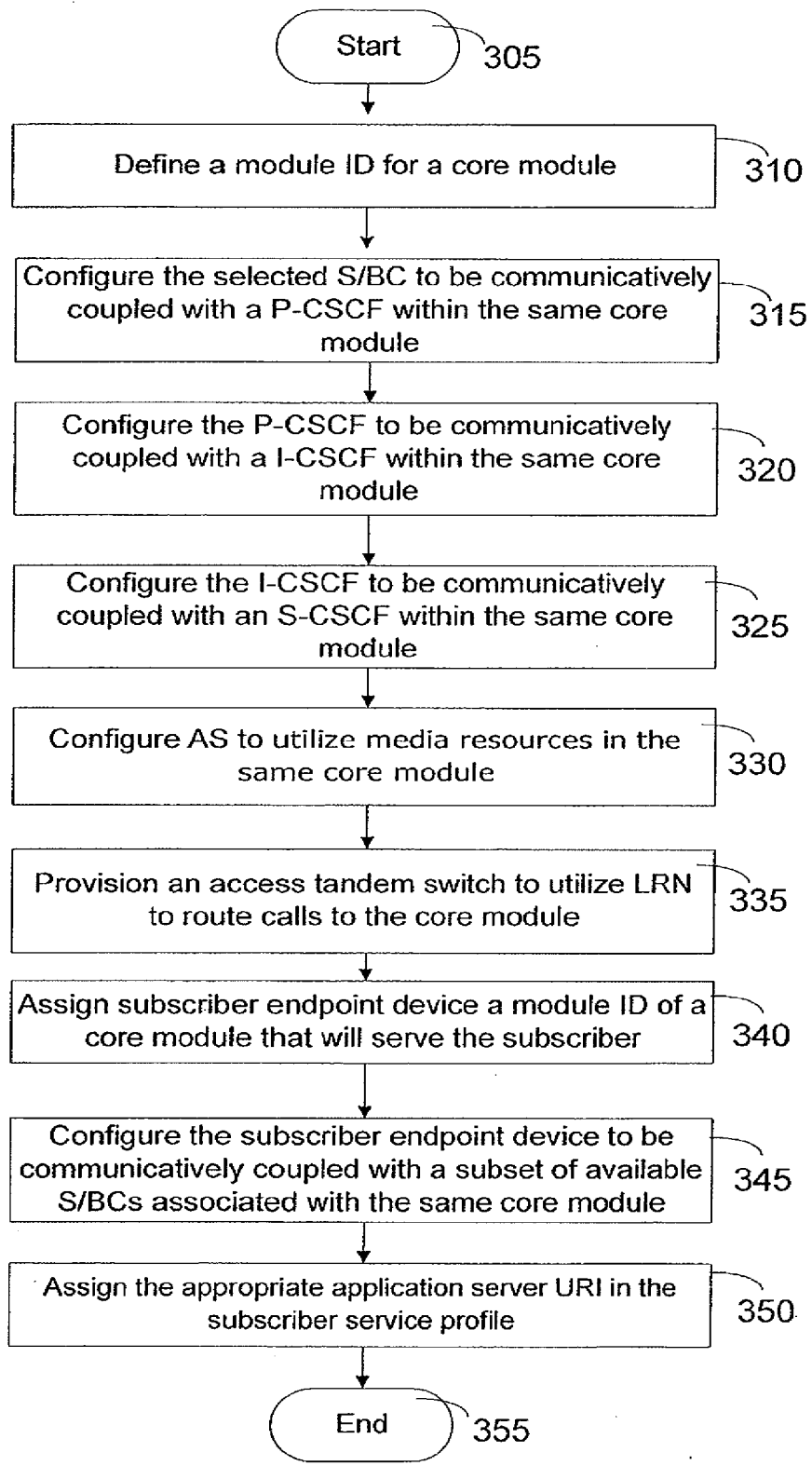
FIG. 3 illustrates a flowchart of a method of communicatively coupling network entities associated with an NGN.

FIG. 3 illustrates a flowchart of a method 300 of communicatively coupling network entities associated with an NGN of the present disclosure. Method 300 starts in step 305 and proceeds to step 310.

In step 310, the provisioning system assigns a module ID for a core module to be deployed.

In step 315, the provisioning system configures a selected S/BC to be communicatively coupled with a P-CSCF within the core module. Note the P-CSCF selected has the same module ID to be assigned to a subscriber endpoint device associated with that particular P-CSCF.

In step 320, the provisioning system configures the P-CSCF selected in step 315 to be communicatively coupled with an I-CSCF within the core module. Note the I-CSCF selected has the same module ID to be assigned to a subscriber endpoint device associated with that particular I-CSCF.

In step 325, the provisioning system configures the I-CSCF selected in step 320 to assign a subscriber endpoint device to a S-CSCF in the core module. In addition, if a HSS is responsible for assigning a S-CSCF to the subscriber endpoint device, the HSS uses the modular relationship to assign the subscriber endpoint device to a S-CSCF in the same core module having the same module ID assigned to the subscriber endpoint device. Note the S-CSCF assigned has the same module ID to be assigned to the subscriber endpoint device.

In step 330, the provisioning system configures application servers to utilize media resources within the same core module when needed for communication services.

In step 335, the provisioning system configures a PSTN access tandem switch connected to a virtual MGW associated with the core module via a trunk group, e.g., a T1 facility, to use an assigned LRN associated with a MGCF in the core module to route a PSTN originated call to that MGCF for call processing.

In step 340, the provisioning system assigns the individual module ID to a subscriber endpoint device so that the subscriber endpoint device will be associated with a core module in which end-to-end communication services will be provided to the subscriber endpoint device. For example, the module ID is stored in the OSS systems, such as the subscriber database, the subscriber provisioning system, and the network equipment inventory system, etc.

In step 345, the provisioning system configures the subscriber endpoint device to be communicatively coupled with a subset of available S/BCs associated with the core module. Note the S/BCs selected have the same module ID assigned to the subscriber endpoint device in step 340.

In step 350, the provisioning system assigns the appropriate application server URI in the iFCs (initial Filter Criteria) in the subscriber service profile associated with the subscriber endpoint device so that an S-CSCF will always invoke the application servers within the same core module, when providing communication services to the subscriber endpoint device associated with the core module. Note the application servers invoked have the same module ID assigned to the subscriber endpoint device in step 340. The method ends in step 355.

It should be noted that various steps in FIG. 3 can be implemented in a one-time process when the core module is deployed. In contrast, various steps (e.g., steps 340, 345 and 350) in FIG. 3 are implemented recurrently, e.g., when each new subscriber is added to a particular core module for support.

Furthermore, the steps in FIG. 3 should not be deemed to be exhaustive. In other words, various other steps or processes may be necessary to fully deploy a core module that are not discussed in FIG. 3, e.g., testing, verification and so on.

It should be noted that although not specifically specified, one or more steps of methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application.

Figure 4:
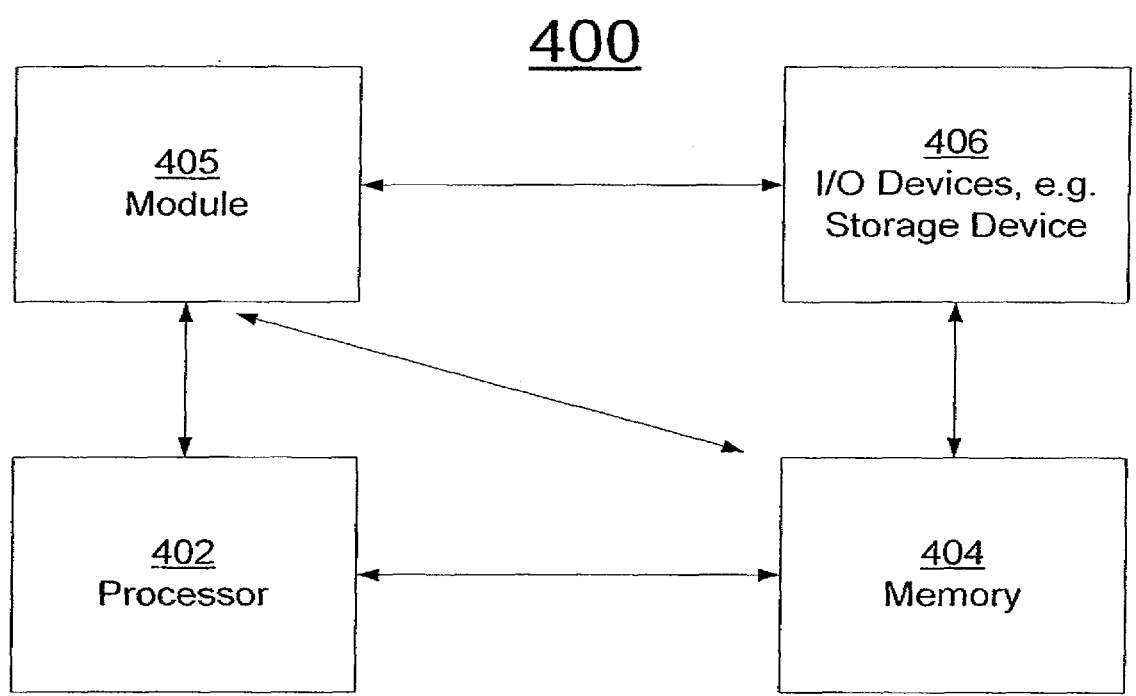
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for growing a next generation network (NGN) using modular design, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for growing a next generation network (NGN) using modular design can be loaded into memory 404 and executed by processor 402 to implement the functions as discussed above. As such, the present process 405 for growing a next generation network (NGN) using modular design by (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for growing an existing internet protocol multimedia subsystem network, comprising:
defining a growth core module to support a specific number of subscribers, wherein the growth core module is assigned a module identifier;
upgrading existing network entities that are impacted by an installation of the growth core module in the existing internet protocol multimedia subsystem network; and
installing the growth core module in the existing internet protocol multimedia subsystem network, wherein the existing Internet protocol multimedia subsystem network comprises:
a plurality of existing core modules, wherein each of the plurality of existing core modules comprises: a plurality of existing local component groups, wherein each of the plurality of existing local component groups comprises a set of existing network entities comprising: a plurality of home subscriber servers, a plurality of proxy call session control functions, a plurality of interrogating call session control function, a plurality of serving call session control functions, a plurality of media gateway control functions, and a plurality of application servers;
a plurality of existing access nodes wherein each of the plurality of existing access nodes comprises a set of existing network entities comprising: a plurality of existing session border controllers, a plurality of existing media gateways, and a plurality of existing media servers, wherein each of the plurality of existing media gateways comprises a plurality of virtual media gateways; and
a plurality of existing common resources, wherein the plurality of existing common resources comprises: a plurality of existing domain name system servers, a plurality of existing E.164 number mapping servers, a plurality of existing element management systems, and a plurality of existing operations support systems.

2. The method of claim 1, wherein each of the plurality of existing core modules is assigned a respective module identifier, where all of the existing network entities in the each of the plurality of existing core modules, all of the existing network entities in each of the plurality of existing access nodes associated with the each of the plurality of existing core modules, and all subscriber devices served by the network entities in the plurality of existing access nodes associated with the each of the plurality of existing core modules are assigned the same respective module identifier as that of the each of the plurality of existing core modules.

3. The method of claim 1, wherein the defining comprises:
specifying the growth core module to be populated with a plurality of new local component groups, wherein each of the plurality of new local component groups comprises a set of new network entities comprising: a plurality of home subscriber servers, a plurality of proxy call session control functions, a plurality of interrogating call session control functions, a plurality of serving call session control functions, a plurality of media gateway control functions, and a plurality of application servers.

4. The method of claim 1, wherein the upgrading comprises:
identifying all existing network entities in existing core modules and in common resources that need to be reconfigured when the growth core module is deployed; and
defining a deployment plan for the installation of the growth core module that includes a scheduling of installation of new network entities associated with the growth core module, the scheduling to take into consideration maintenance window requirements, and a reconfiguration of existing network entities residing in the existing core modules and common resources.

5. The method of claim 1, further comprising:
using a local routing number by an access tandem switch in a public switched telephone network to route a call destined to a subscriber device served by the existing internet protocol multimedia subsystem network for call processing.

6. A method for growing an existing internet protocol multimedia subsystem network, comprising:
defining a growth core module to support a specific number of subscribers, wherein the growth core module is assigned a module identifier, wherein the defining comprises specifying the growth core module to be populated with a plurality of new local component groups, wherein each of the plurality of new local component groups comprises a set of new network entities comprising: a plurality of home subscriber servers, a plurality of proxy call session control functions, a plurality of interrogating call session control functions, a plurality of serving call session control functions, a plurality of media gateway control functions, and a plurality of application servers, wherein each of the plurality of new local component groups in the growth core module is deployed in a geographically different server office to allow network entities in each of the plurality of new local component groups to support geographical level failover protection of network entities located in a different new local component group associated with the growth core module;
upgrading existing network entities that will be impacted by an installation of the growth core module in the existing internet protocol multimedia subsystem network; and
installing the growth core module in the existing internet protocol multimedia subsystem network.

7. A method for growing an existing internet protocol multimedia subsystem network, comprising:
defining a growth core module to support a number of subscribers, wherein the growth core module is assigned a module identifier;
upgrading existing network entities that are impacted by an installation of the growth core module in the existing internet protocol multimedia subsystem network; and
installing the growth core module in the existing internet protocol multimedia subsystem network, wherein the installing the growth core module comprises:
installing new network entities associated with each of a plurality of local component groups defined in the growth core module;
assigning all of the new network entities associated with each of the plurality of local component groups to have a same respective module identifier as that of the growth core module in a plurality of existing operations support systems, including a subscriber database, and a network equipment inventory system; and
using a combinations of firewall rules and temporary configurations to segregate the growth core module from the existing internet protocol multimedia subsystem network.

8. The method of claim 7, further comprising:
installing additional network entities comprising: session border controllers, virtual media gateways, and media servers, in a plurality of access nodes which are associated with the growth core module in the existing internet protocol multimedia subsystem network;
assigning the additional network entities the same respective module identifier as that of the growth core module in the plurality of existing operations support systems, including the subscriber database, the subscriber provisioning system, and the network equipment inventory system; and
assigning subscriber devices served by the network entities in the plurality of access nodes associated with the growth core module the same respective module identifier as that of the growth core module in the plurality of existing operations support systems, including the subscriber database, the subscriber provisioning system, and the network equipment inventory system.

9. The method of claim 8, wherein each of the session border controllers and each of the virtual media gateways is only interconnected to the growth core module.

* * * * *